United States Patent [19]
Lester

[11] 3,805,227
[45] Apr. 16, 1974

[54] ELECTRONIC TRACKING LOCATING SYSTEM USING MULTIPLE FREQUENCY, MODULATED, AND TIME DELAYED ULTRASONIC SIGNALS

[75] Inventor: Robert W. Lester, Manhasset, N.Y.
[73] Assignee: RCDS Enterprises, Inc., New York, N.Y.
[22] Filed: Oct. 3, 1972
[21] Appl. No.: 294,761

[52] U.S. Cl............. 340/16 R, 340/3 E, 340/152 T, 340/312
[51] Int. Cl............................ G08b 5/00, G01s 3/80
[58] Field of Search ........ 340/3 C, 3 E, 312, 152 T, 340/16 R; 343/6.5 SS

[56] References Cited
UNITED STATES PATENTS
3,439,320  4/1969  Ward................................ 340/3 CX
3,182,315  5/1965  Sweeney........................ 343/6.5 SS Primary Examiner—Richard A. Farley
Attorney, Agent, or Firm—Greene & Durr

[57] ABSTRACT

An electronic tracking and locating system for automatically locating at least one of a select group of individuals or objects disposed within a selected area of surveillance is disclosed. The system comprises an ultrasonic identification signal generator and transmitter for generating and transmitting the identification signal at one of a plurality of preselected frequencies throughout the selected area of surveillance, the frequency of the signal being unique with respect to the individual or object to be located. Transceivers are disposed remotely from the identification signal generator and transmitter, and are carried by each individual or object within the select group for receiving the identification signal. The transceivers transmit an output signal at a preselected frequency in response to an identification signal having a frequency corresponding to the frequency designated to the person or object and transceiver. Receivers selectively disposed throughout the area of surveillance receive the transmitted output signal from the transceiving means, and transmit a location identification signal which identifies the location within the area of surveillance of the output signal receiver. A console is disposed at a central location within the area of surveillance for receiving the location identification signal and indicating the location of the person or object located.

10 Claims, 14 Drawing Figures

ELECTRONIC TRACKING LOCATING SYSTEM USING MULTIPLE FREQUENCY, MODULATED, AND TIME DELAYED ULTRASONIC SIGNALS

The present invention relates to tracking and locating systems, and in particular to an ultrasonic electronic tracking and locating system for automatically locating a select group of persons or objects within a selected area of surveillance.

Ultrasonic tracking and locating systems in which signals are coded digitally and transmitted into an area of surveillance to activate remote mobile transceivers carried by persons or objects to be located are known. One example of such a system is disclosed in the applicant's co-pending patent application, Ser. No. 160,851, filed on July 8, 1971, entitled "Ultrasonic Tracking and Locating System now U.S. Pat. No. 3,696,384 issued Oct. 3, 1972." Such systems, however, are very complex and correspondingly expensive, especially when utilized to track and locate many persons within a selected area. The larger the area, the number of rooms in the area, and the number of persons in the system to be located, the greater the complexity of the digital coding apparatus and the transmitters which are required to be used in the system, due to the greater delay time necessary to transmit digitally coded signals to the transceivers of the system. A minimum number of bits is required in a digitally coded system, generally 10 in number, in order to generate an encoded signal, and since ultrasonic transmission is relatively slow, and such signals travel only a distance of approximately 75–100 feet in humid air, and even less in dry air, transmission to the transceivers of such a system is limited in distance and cannot be instantaneous. The complex nature of digitally coded systems, and their inability to achieve instantaneous signal transmission to the transceivers of the system are significant limitations and disadvantages. In addition, digital systems require that a starting pulse be generated and synchronized with the shift register of the system, which causes interference or noise signals to affect the system. The encoded digital signals must also be spaced apart a minimum time to prevent signal overlap in areas where a plurality of transceivers are present. This further reduces the speed of transmission of the encoded system signals. Another significant disadvantage is that all the transceivers of such systems are actuated by transmitted signals, thus wasting valuable electrical power stored in their battery power supplies. This causes unnecessary expense in recharging and replacing such power supplies.

Accordingly, the present invention provides an improved ultrasonic tracking and locating system which obviates the disadvantages of heretofore known digitally coded systems. The electronic tracking and locating system of the present invention automatically locates at least one of the select group of individuals or objects disposed within a selected area of surveillance, and comprises means for generating and transmitting an identification signal at one of a plurality of preselected frequencies throughout the selected area of surveillance, the frequency of said signal being designated to the individual or object to be located for identifying the person or object. The system further comprises a transceiving means, remote from the identification signal generating and transmitting means, carried by each individual or object within the select group, for receiving the transmitted identification signal, and transmitting an ultrasonic output signal, at a predetermined frequency, in response to reception of an identification signal having a frequency corresponding to that designated to the person or object carrying the transceiving means. The system also comprises means, selectively disposed throughout the area of surveillance, for receiving the transmitted output signals from the transceiving means, and transmitting a location identification signal which identifies the location within the areas of surveillance of the transceiving means, and means disposed at a central location within the area of surveillance, for receiving the location identification signal and indicating the location of the person or object.

In one embodiment of the present invention, the signal generating and transmission means includes a frequency selection means for generating signals at one of a plurality of pre-selected frequencies and transmitting said signals into the area of surveillance. The transceiving means carried by the person or object to be located responds only to that one selected frequency transmitted, and generates a return signal at a predetermined frequency which is common to all the other transceivers carried by the persons or objects in the surveillance area.

In another embodiment of the invention, the transceiving means carried by the persons or objects generate one of a plurality of multiple return frequencies in response to the generation of the signal by the signal generating and transmission means. The frequency which will be received by the receiving means of the system is selected when the signal is generated by the signal generating and transmitting means. Thus, the number of persons or objects which can be included in the system is increased.

In still another embodiment of the invention, time-delays are utilized in the transceiving means carried by the persons or objects, and in the receiving means, for delaying the generation and transmission of the signals by the transceiving means, thereby classifying the transceivers into "time slots" according to their delayed response time and further increasing the capacity of the locating and tracking system.

In still a further embodiment of the invention, multiple time slots are used in combination with multiple transmission and multiple return frequencies, to further increase the capacity of the system.

And, in still further embodiments of the invention, the signal generated by the signal generating and transmission means, and the signals transmitted by the transceiving means carried by the persons or objects, are modulated, so as to further increase the capacity of the locating and tracking system.

It is, therefore, an object of the present invention to provide an electronic tracking and the locating system which is less complex than heretofore known digitally coded systems.

It is also an object of the present invention to provide an electronic tracking and locating system having sufficient capacity to include additional persons or objects in the tracking and locating system without increasing the complexity thereof.

It is still another object of the present invention to provide an electronic tracking and locating system which is simple in design, easy to manufacture, and efficient and reliable in operation.

Other objects and features of the present invention will become apparent from the following detailed description taken in connection with the accompanying drawings which disclose illustrative embodiments of the invention. It is to be understood that the drawings disclosing these embodiments are designed for the purposes of illustration only, and are not intended as a definition of the limits and scope of the invention disclosed therein.

Referring to the drawings, wherein similar reference numerals denote similar elements throughout the several views.

Figure 1:
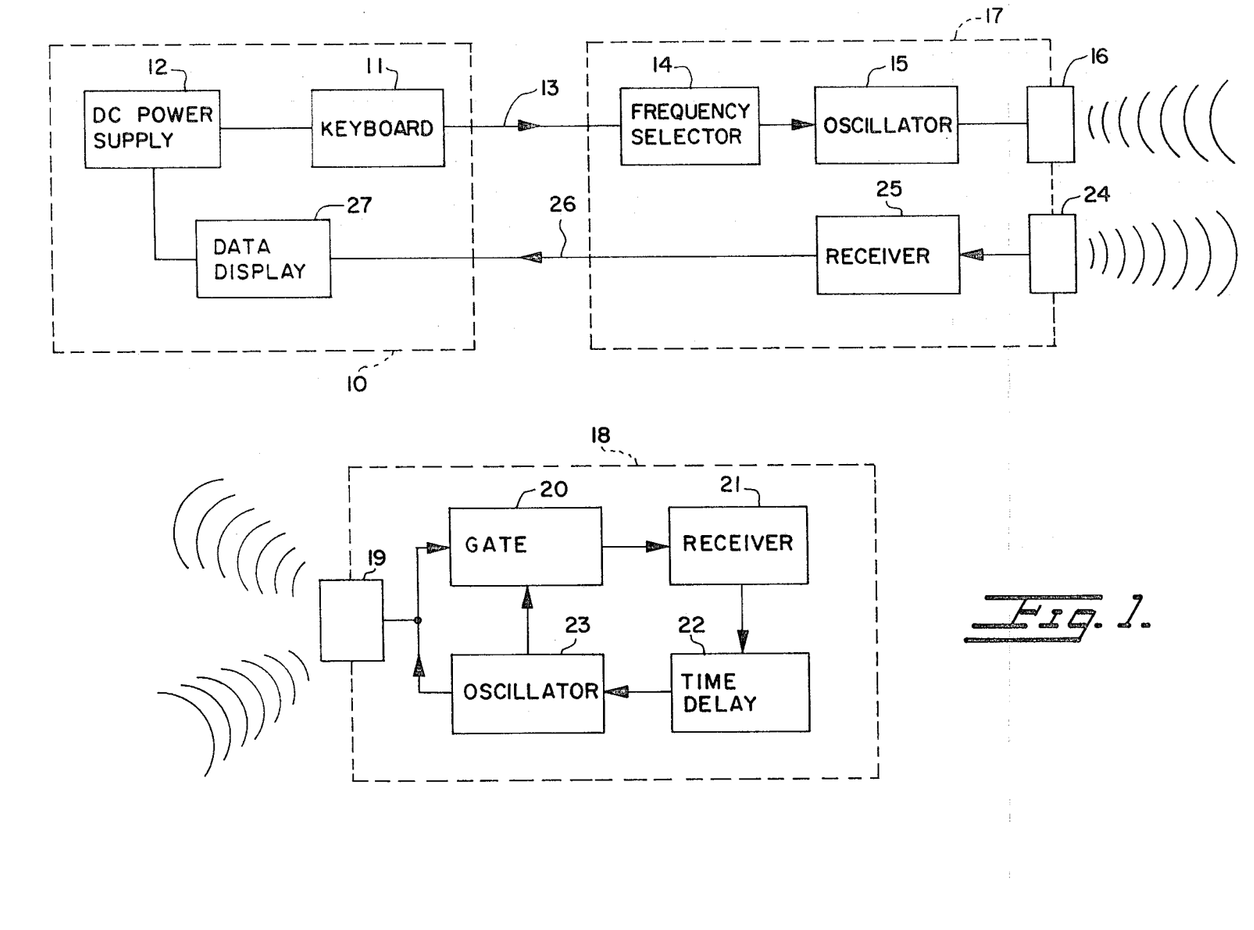
FIG. 1 is a block diagram of an ultrasonic, electronic tracking and locating system constructed in accordance with the present invention.

Referring now to the drawing, specifically FIG. 1, there is shown an ultrasonic tracking and locating system comprising a console 10 having a keyboard 11 including a plurality of manually-operable buttons which is coupled to a DC power supply 12. The keyboard is coupled by multi-conductor cable 13 to a frequency selector 14, an oscillator 15, and a transducer 16, which may be a piezoelectric crystal. The frequency selector, oscillator and transducer comprise the signal generating and transmission means of the tracking and locating system and are responsive to the buttons of keyboard 11. Transducer 16 is disposed in a remotely positioned room unit 17, located in the rooms, hallways, ets. of a building which is selected as or included in the area of surveillance. A mobile transceiver 18 is carried by each of the persons or objects to be located in the area of surveillance, and includes a transducer 19, which also may be a piezoelectric crystal, coupled to a gate 20 and a receiver 21 which is tuned to a specific frequency designated for reception by the transceiver. Time delay 22 is coupled to receiver 21 and to an oscillator 23, which generates, after a predetermined time period controlled by time delay 22, an output signal which is converted from electrical to ultrasonic signal and transmitted by transducer 19. A second transducer 24 is provided in room unit 17, and is coupled to a receiver 25 which receives the signals transmitted by transceiver 18. An output signal is transmitted over multi-conductor cable 26 to data display 27, which indicates the location of the person whose transceiver responds to the signals transmitted.

Figure 2:
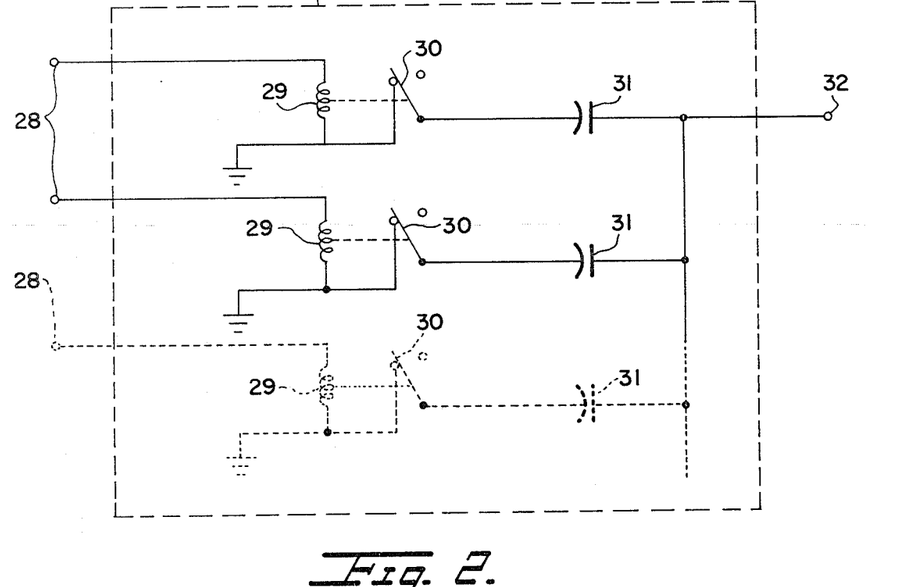
FIG. 2 is a schematic diagram of the frequency selector of the system illustrated in FIG. 1.

Frequency selector 14 is illustrated schematically in detail in FIG. 2. Multi-conductor cable 13 couples the keyboard buttons to terminals 28 of frequency selector 14. Each terminal couples one of the buttons to a relay coil 29, which controls a relay switch 30 coupled to a capacitor 31. All the capacitors are coupled to output terminal 32 of the frequency selector, which is connected to oscillator 15 so as to control the frequency generated thereby.

In operation of this embodiment of the invention, a plurality of different frequencies are pre-selected by the user of the system, and one frequency is designated to each of the persons which are to be located by the system in the area of surveillance. The range of frequencies used in the system preferably range between 20–60,000 cycles, with spacings between frequencies of approximately 1,000 cycles. This requirement, however, may be reduced, if necessary, to increase the number of people capable of being handled by the system. This embodiment of the invention is particularly suited for use where there are few people and many locations in the area of surveillance.

Each of the frequencies to be generated by frequency selector 14 are assigned a number corresponding to numbers on the buttons of keyboard 11, and are then designated individually to the objects and persons in the system. When a particular button on keyboard 11 is depressed, a signal is transmitted over multi-conductor cable 13 to one of the relay coils 29, and the corresponding switch 30 is closed so that the corresponding capacitor 31 is connected to oscillator 15, thereby causing generation of a signal at the frequency corresponding to the number of the button depressed. Oscillator 15 transmits the electrical signal generated to transducer 16 which converts the electrical signal to an ultrasonic signal, and radiates the signal throughout the area adjacent each of the room units 17. After the signal is transmitted, it is received by each of transceivers 18 carried by the persons or objects in the system. Transducer 19 included therein converts the ultrasonic signals into electrical signals and transmits them to gate 20. Transceiver 18 includes a portable battery or other suitable power supply, not shown, which is continuously coupled to the transceiver circuits so that each transceiver is in a continuous "listening" mode. Gate 20 is coupled to a receiver which is tuned to receive only those signals having the particular frequency corresponding to that designated to the transceiver. Upon the reception of such a signal, receiver 21 generates an output signal which is delayed by a predetermined time period by time delay circuit 22, so that activation of the transceiver to its "transmitting" mode does not occur before termination of the transmission of the signals from room unit 17. Oscillator 23 is activated by a signal generated by time delay circuit 22, and generates an electrical signal at a frequency at which all other transceivers in the system transmit. This signal is fed to transducer 19, which converts the electrical signal to an ultrasonic signal and radiates the signal throughout the room in which the transceiver is located. Transducer 24 in room unit 17 receives the ultrasonic signal transmitted by transceiver 18, and converts it to an electrical signal and transmits it to receiver 25, which is tuned to receive the single return frequency generated by all the transceivers of the system. Multi-conductor cable 26 couples the receiver to data display 27, and the location of the room unit 17 receiving the signal from the transceiver is displayed in a numerical code on data display 27.

Figure 8:
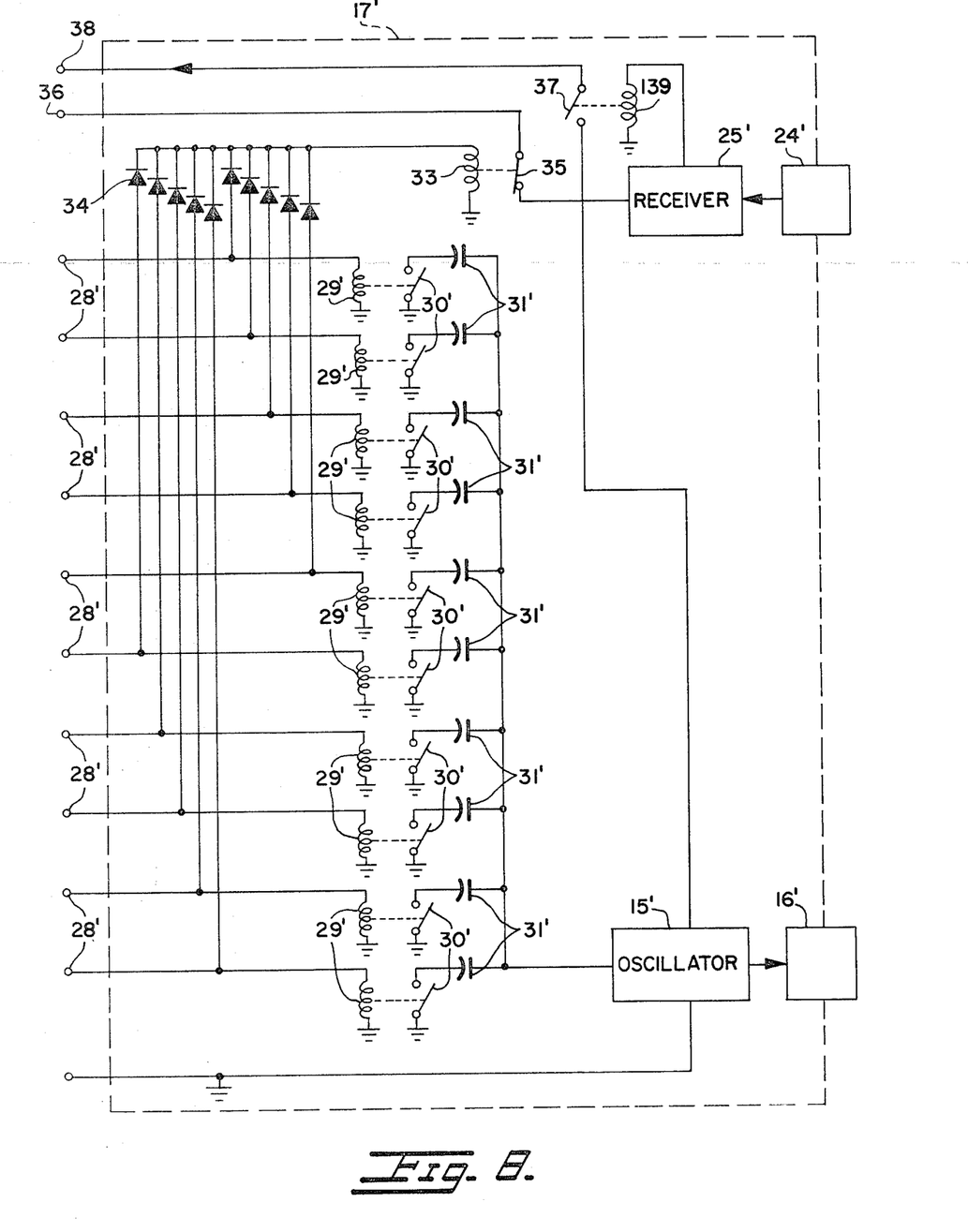
FIG. 8 is a schematic diagram of a specific multiple person electronic tracking and locating system constructed in accordance with the present invention.

FIG. 8 illustrates a room unit for use with a 10-person tracking and locating system. Room unit 17' has its input terminals 28' coupled to the buttons on keyboard 11 and to switching relay coils 29'. The relay coils operate relay switches 30' selectively in response to the button depressed on keyboard 11, and control the frequency output of oscillator 15' by inserting one of the capacitors 31' into the electrical circuit connected to the oscillator. Oscillator 15' transmits the signal generated to transducer 16' which converts the electrical signal into an ultrasonic signal and radiates it throughout the room adjacent the room unit.

Each of terminals 28' is coupled to a relay coil 33 by a diode 34. The relay coil controls a relay switch 35 coupled to receiver 25'. Receiver 25' is normally in a constant "listening" mode, i.e., a power supply to the room sensor unit 17' is continuously coupled to the receiver. When the buttons of the keyboard are depressed, however, and one of the relay switches 30' is closed, relay switch 35 is opened by the activation of one of these relay switches and disconnects receiver 25 for the period of time during which oscillator 15' and transducer 16' are generating the signal and transmitting it outwardly into the room adjacent the room unit. When the buttons are released, and switches 30' opened, switch 35 is released to its normal closed position, and receiver 25' is reconnected to the power supply so as to assume its "listening" mode. Terminal 36 preferably couples a 20 volt power line to receiver 25' by means of relay switch 35. Transducer 24' receives signals transmitted by the transceivers carried by the persons or objects in the system, and transmits them to receiver 25' which is tuned to receive the common return frequency transmitted by all the transceivers. The receiver transmits an output signal which energizes a relay coil 139 to close a relay switch 37. Switch 37 couples oscillator 15' to terminal 38 which is coupled to data display 27 in console 10. When the signal is received by receiver 25', switch 37 is closed, and the signal being generated by oscillator 15' is transmitted to the data display to activate a light or other suitable indicator above the room location code number and thereby indicate the whereabouts of the person or object being sought in the area of surveillance. After the light has been illuminated by the return signal, the operator releases the buttons on the keyboard and oscillator 15' is deactivated, thus resetting the system.

Figure 3:
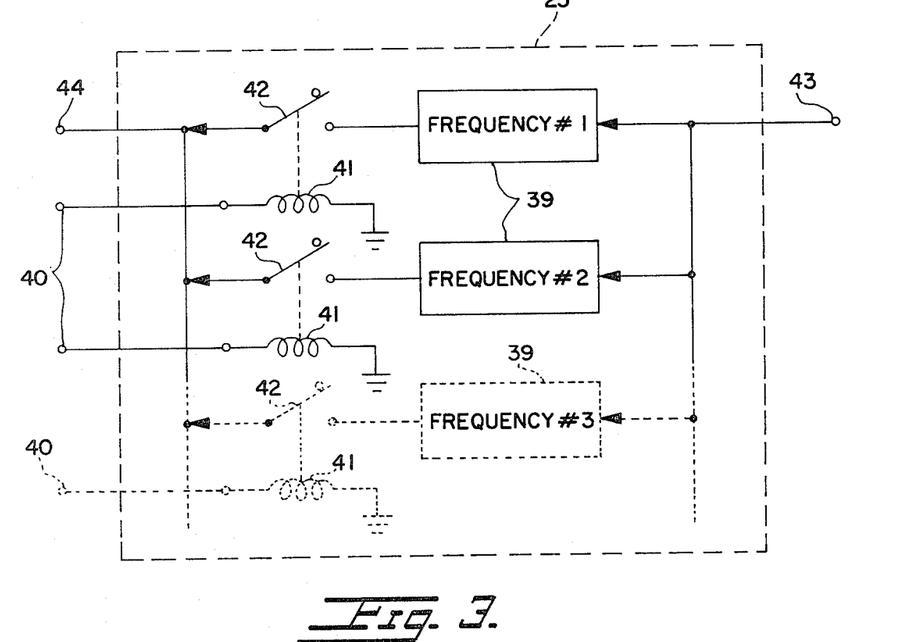
FIG. 3 is a schematic diagram of a multiple frequency room receiver of another embodiment of a tracking and locating system constructed in accordance with the present invention.

Referring back to FIG. 3, there is shown another embodiment of a room unit receiver for use with the tracking and locating system of FIG. 1. In this embodiment, the capacity of the system is increased by providing multiple return frequencies from the transceivers carried by the persons or objects in the system. Each of the transceivers of the system generate signals at one of a plurality of selected return frequencies, and transmit the signals ultrasonically to the room unit. With such a system, it is necessary, therefore, for the keyboard to not only select the signal to be transmitted into the area of surveillance, but also select the return frequency which is to be detected by the room unit. Receiver 25'' is provided with a plurality of individual receivers 39 which are tuned to one of the multiple return frequencies selected. Terminals 40 of receiver 25'' are coupled to terminals 28 of the frequency selector so that when the buttons on keyboard 11 are depressed, one of relay coils 41 is energized, and closes corresponding relay switch 42. Depending upon which switch is closed, the signal transmitted to terminal 43 from transducers 24 is received and detected by its corresponding tuned receiver 39, and transmitted to terminal 44 of the receiver coupled to multi-conductor cable 26. Each transceiver carried by the persons or objects in the area of surveillance receives signals at only one of the frequencies which can be transmitted by the system, and each responds only with signals at a selected one of the multiple return frequencies. One of each of the terminals 40 of receiver 25'' is connected to selected ones of the terminals of the frequency selector, so that the depression of each of the keyboard buttons corresponding to each frequency activates one of the switches 42 in receiver 25'', and thereby preventing the reception of all signals generated by the transceivers except for those at that frequency specifically chosen by the keyboard operator. In other words, if a transceiver is designated to receive signals at frequency # 1, and to respond with signals at frequency # 3, the keyboard button corresponding to the person to be located is coupled to the terminal of the frequency selector connected to the capacitor which causes generation of frequency # 1, and also to the terminal of the receiver which closes the relay switch 42 connected to the receiver tuned to frequency # 3.

Figure 4:
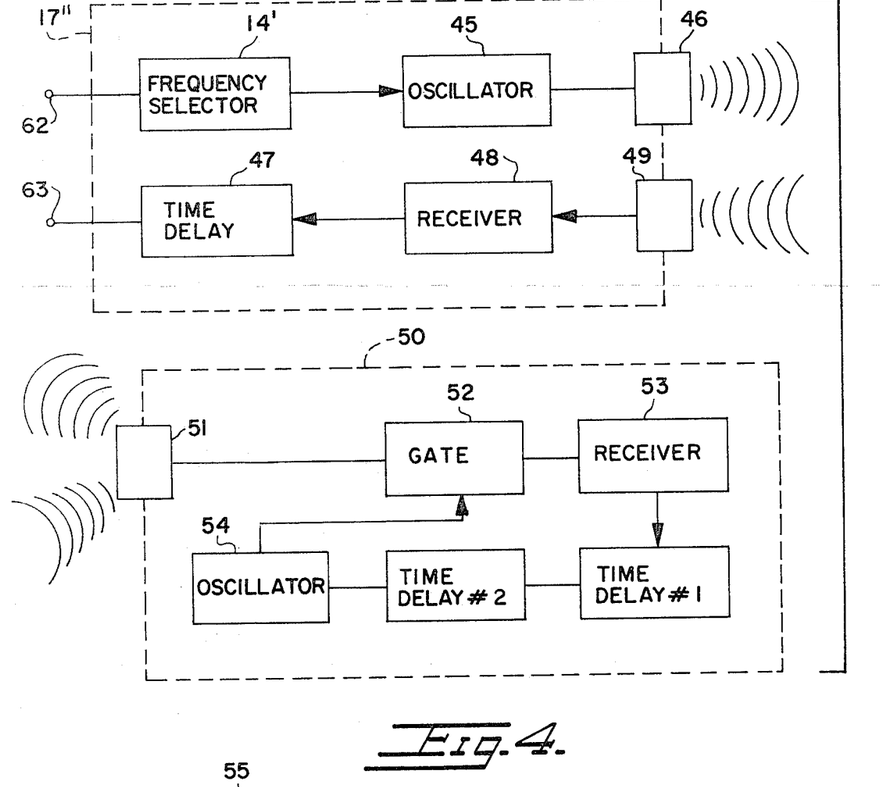
FIG. 4 is a partial block diagram of still another embodiment of a tracking and locating system constructed in accordance with the present invention.
Figure 5:
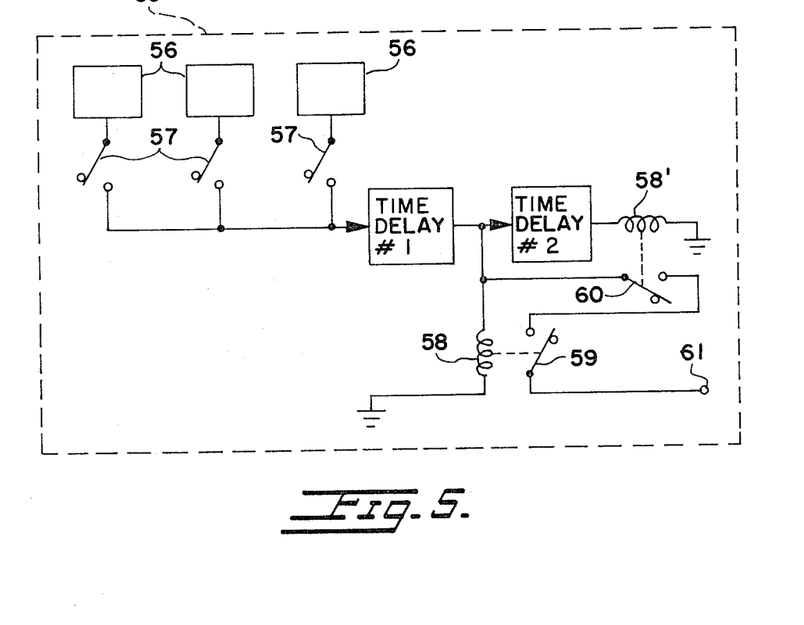
FIG. 5 is a schematic block diagram of the console of the locating system illustrated in FIG. 4.

FIGS. 4 and 5 partially illustrate another embodiment of the present invention. Room unit 17 comprises a frequency selector 14' coupled to an oscillator 45 and transducer 46. The room unit includes a time delay circuit 47 coupled to a receiver 48 and transducer 49 for receiving a signal emitted from a remote portable transceiver 50. Time delay 47 allows transmission of an output signal from receiver 48 only during a predetermined time period after which the signal is transmitted by transducer 46 into the rooms of the surveillance area. When a signal is received, transceiver transducer 51 transmits the signal to gate 52 and receiver 53, which is tuned to receive one of several different frequencies similar to the previous embodiments. Time Delay 1 is coupled to receiver 53 and delays the transmission of a signal from receiver 53 for a predetermined time period until after transmission of the signal from the room unit is terminated. The output signal generated upon reception of the proper signal is further delayed by Time Delay 2 for a second predetermined time period, so that initiation of transmission by the transceiver occurs within the time period for transmission controlled by time delay 47. Oscillator 54 is activated by the output signal from Time Delay 2, and generates an electrical signal of a predetermined frequency and transmits it to transducer 51, which converts the electrical signals into ultrasonic signals and radiates them throughout the room in which the transceiver is disposed.

FIG. 5 illustrates the control console which is used for this system. Console 55 includes a plurality of manually operable push buttons 56 connected to switches 57. The console allows return signals transmitted to it to be accepted only during a pre-selected time interval. Time Delay 1 controls the instant at which the time delay period begins, and Time Delay 2 controls the duration of the time delay period. The time delay caused by Time Delay 2 is fixed in duration, while the time delay caused by Time Delay 1 is adjustable. The console, through the use of the time delays, controls the selection of the time slot in which the signal is received, so that it can be identified as that of the transceiver of the person or object being located.

The operation of this embodiment of the invention is as follows:

One of push buttons 56 on the keyboard of console 55 corresponding to the person to be located is depressed. One of switches 57 is then closed, and Time Delay 1 is activated. An output signal is generated by the time delay which activates Time Delay 2 and relay coil 58, and closes relay switch 59. Simultaneously, Time Delay 2 energizes relay coil 58' and closes relay switch 60 so that the outgoing signal is transmitted to frequency selector 14' through terminal 61 of the console which is connected to terminal 62 of the room unit. Simultaneously, the frequency for the outgoing signal is selected by the frequency selection apparatus and method described above in the previous embodiments not shown in FIGS. 4 and 5 for purposes of clarity. Oscillator 45 transmits an electrical signal of a specified frequency to transducer 46, which radiates the signal throughout the area of surveillance. Transducer 51 of receiver 50 receives the signal and converts it to an electrical signal and transmits it to gate 52 and receiver 53, which is tuned to receive only one specified frequency. If the frequency designated to the person carrying the transceiver is received, an output signal is transmitted to Time Delay 1, which delays the initiation of transmission of the return signal for a predetermined period of time after transmission from the room unit has ended. Time Delay 2 is responsive to Time Delay 1, and determines the duration of the signal transmitted. Oscillator 54, in response to a signal from Time Delay 2, generates an electrical signal at a predetermined frequency and transmits it to gate 52 and transducer 51, the latter of which converts the electrical signals into ultrasonic signals and radiates them throughout the room. The system described may utilize either a single frequency return, or a multiple frequency return. Furthermore, several different time delays designated to groups of transceivers may be utilized.

When a button 56 is depressed, time delay 1 initiates the signal transmission, and Time Delay 2 controls the duration of the outgoing signal. The time delays of each transceiver have predetermined values which are calculated to correspond to the time delays of the console so that the signal which is to be received at the console will be received during a predetermined time interval. Hence, Time Delay 1 in the transceiver commences transmission of a signal a predetermined time after the termination of transmission by console 55, and Time Delay 2 in transceiver 50 controls the duration of the signal for a predetermined time after the termination of transmission from the room unit. The return signal is received by transducer 49 and receiver 48, which is tuned to receive the return frequencies. Time delay 47 controls transmission of the return signal from receiver 48, so that if the received signal is not received within the predetermined time interval during which time delay 47 permits transmission, the signal does not reach the console. The signal must be received within the time period designated by the console, during which time delay 47 allows transmission of signals.

In this system, by classifying the transceivers according to the promptness of their response, it is possible to increase the number of people that can be accommodated by this system several times over. For example, specified transceivers can be constructed so as to respond within one second after the room unit has ended transmission for a duration of ½ second, and other units can be constructed so as to respond within one and two seconds after the room unit transmission has ended for the same duration. A third group of transceivers might respond between two and three seconds after the room unit transmission has ended. Multiple frequency return signals from the transceivers, and time-delayed response transceivers and consoles, may be utilized in combination to further increase the capacity of the locating or tracking system disclosed.

Figures 6, 7:
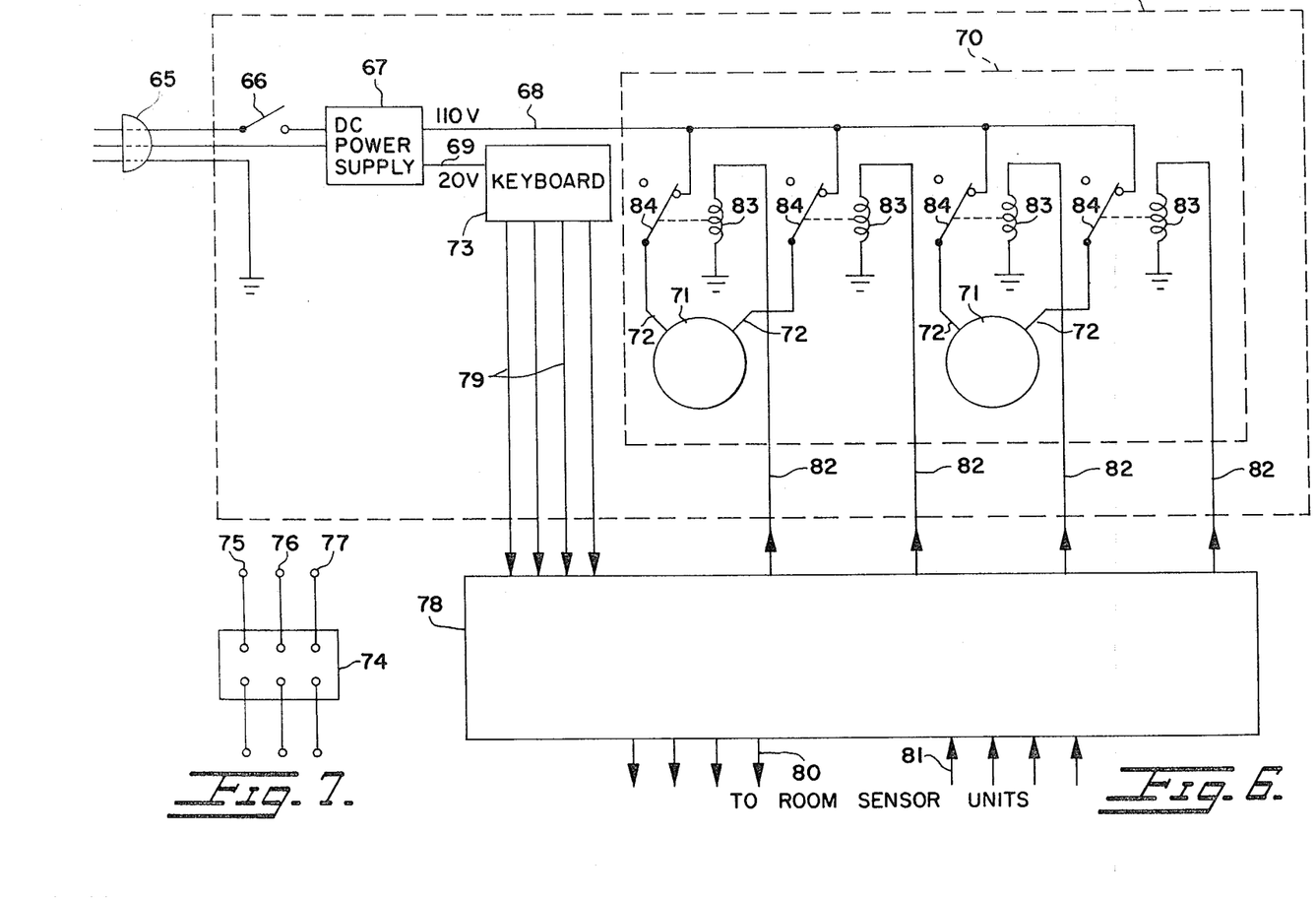
FIG. 6 is a schematic block diagram of another console for use with a locating system constructed in accordance with the present invention.
FIg. 7 is a schematic diagram of the electrical connections to the push buttons on the keyboard of the console illustrated in FIG. 6.

FIGS. 6 and 7 illustrate schematically a console including a display apparatus which may be used with any of the systems of the present invention. Console 64 is coupled by a suitable electrical plug 65 to a 120 volt 60Hz AC power source. Switch 66 switches the console "on" and "off," and is coupled to a DC power supply 67. The power supply has two output lines, 68 and 69, which transmit 100 and 20 volts DC, respectively. The data display 70 is coupled to the 110 volt DC power line, and includes a plurality of digital readout tubes 71 which indicate numerically the location of the room unit which has received a response from a transceiver. Tubes 71 are connected to the 110 volt power line by a plurality of terminals 72, of which only two have been shown for purposes of clarity. Keyboard 73 is connected to the 20 volt DC power line, and each key 74, as illustrated in FIG. 7, has a plurality of terminals 75, 76 and 77, which are coupled to the power and time delay of the console, the outgoing frequency selector, and the return frequency selector, respectively, of the system. A junction box 78 is utilized as an interface between the console and the plurality of room units disposed throughout the area of surveillance. Multiconductor cables 79 couple the push buttons on keyboard 73 to junction box 78.

In operation, when one of the manual push buttons on keyboard 73 is depressed, a signal is transmitted over one of the cables 79 to junction box 78 and outwardly through cables 80 to the room units of the system. The return signal is transmitted back to junction box 78 by cables 81 which are coupled to wires 82 leading to the data display of the console. Wires 82 are connected to the room units so that signals from the room unit cause activation of the readout tubes.

A signal returning through wires 82 activates relay coils 83 to close relay switches 84. Power line 68 is then coupled to one of the plurality of terminals 72 of the tube, and the corresponding digital number is illuminated on tube 71. A combination of numbers, or a single number, in the tubes gives the location of the room in which the person is located. In the console, diodes are connected to each of the terminals of tubes 71 so that numbers, running consecutively upward, can be displayed. Each room requires only a single return wire even though multiple number location codes are used.

Figure 9:
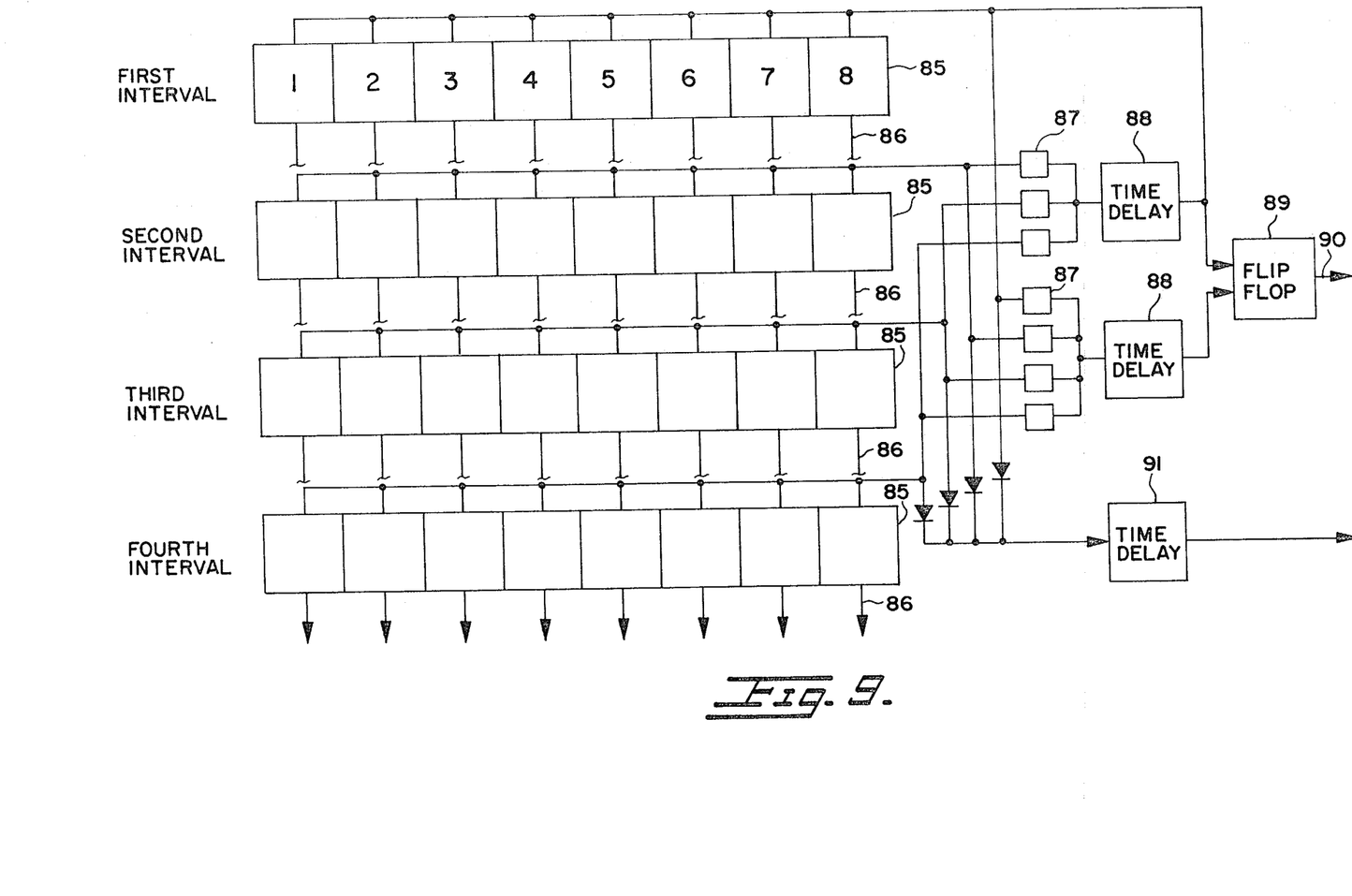
FIG. 9 is a schematic block diagram of one embodiment of a keyboard console for use with an electronic tracking and locating system using delayed response return signals.

A keyboard for use in time delaying responses of the transceivers of the locating system is shown in FIG. 9. A plurality of time intervals are represented by each of a plurality of rows of keyboard keys. The graphical illustration below shows the responses of the transceivers at specified frequencies and in specified time slots:

The keyboard comprises a plurality of manual push buttons 85 which are coupled by multi-conductor cables 86 to the frequency selectors of the apparatus. Each push button corresponds to a person or object to be located in the area of surveillance, and in FIG. 9 eight push buttons are illustrated in each row. Four different rows of eight push buttons are shown, each of the four rows corresponding to an interval. Each interval corresponds to a selected outgoing frequency of transmission and a predetermined time slot, i.e., when any one of the push buttons is depressed, a signal at the frequency corresponding to the interval in which the button is disposed is transmitted, and simultaneously the time slot is selected for receiving the return signal from the remote transceiver of the person or object to be located. The push buttons are coupled to R-C networks 87, time delays 88 and a flip-flop 89. The flip-flop is coupled by cable 90 to a return signal gate. The push buttons are also coupled to another time delay 91 which controls the duration of the outgoing signal from the keyboard.

During operation, if, for example, button # 2 is depressed, a signal at frequency # 1 is transmitted from the room unit into the area of surveillance. Simultaneously, button # 2 selects the return time slot in which the signal must be received in order to be displayed by the data display. The first time slot is selected, and the signal received during this first time period is that of the transceiver of the person designated to receive a signal at frequency # 1 and which is also programmed to respond in time slot # 1. For each interval, a signal at a specified frequency is transmitted, and a specified time slot is selected, upon pressing of the buttons in any one interval.

Figure 10:
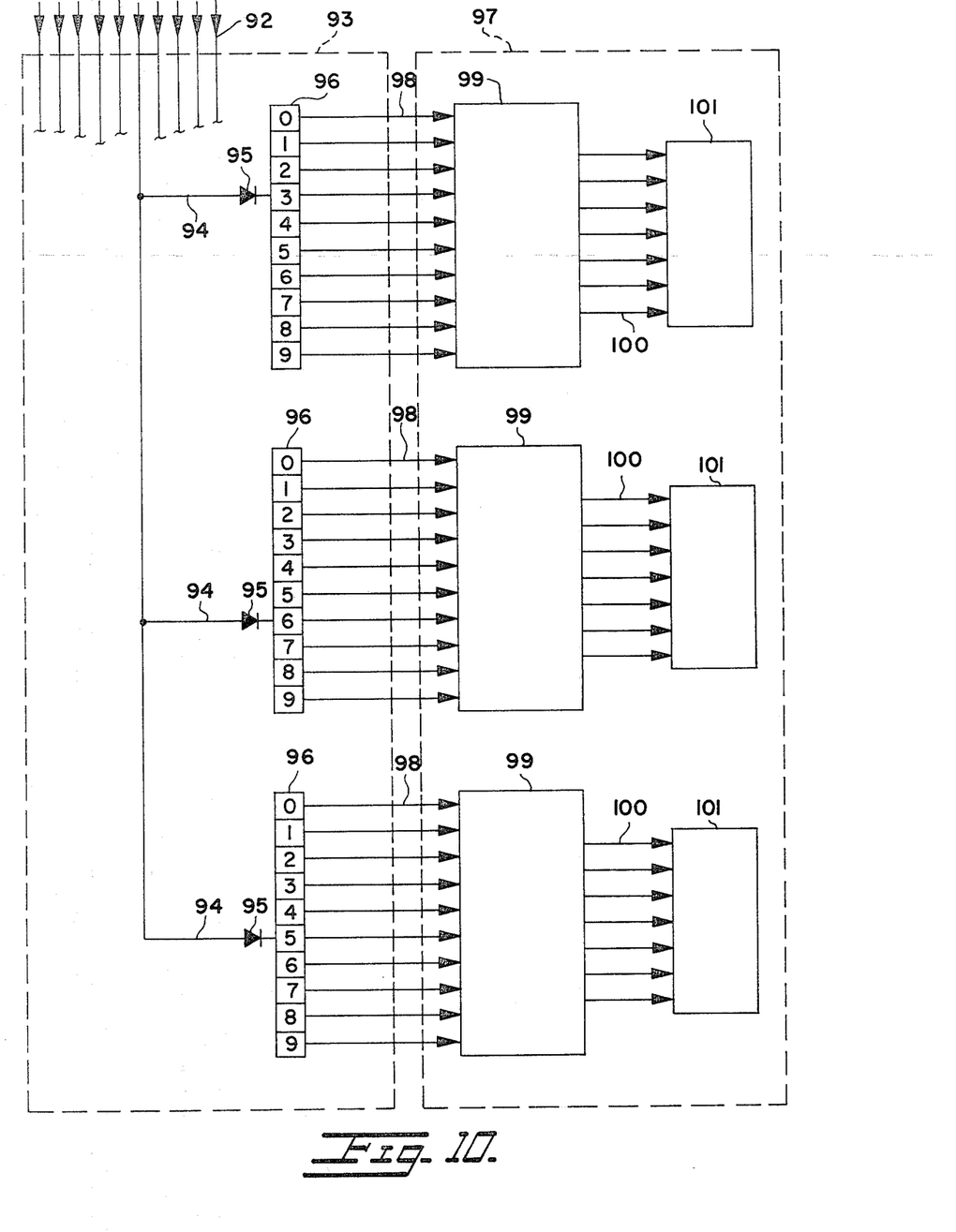
FIG. 10 is a schematic diagram of the return wiring from the room receiving means to the console and data display of the electronic tracking and locating systems of the present invention.

FIG. 10 illustrates the console return wiring and data display which may be utilized with any of the previously described embodiments of the invention. The room units are coupled by separate cables 92 to junction box 93. Each of cables 92 has three separate branch wires 94 coupled to three diodes 95 and selected terminals on terminal strips 96 which correspond to a numerical code selected for the room to which cable 92 is connected. The terminal strips 96 are coupled to console 97 by cables 98. These cables couple the terminal strips to decimal 10 wire to seven segment display diode matrices 99, which in turn are coupled by cables 100 to seven segment displays 101.

In operation, when a return signal from any one of the room units is transmitted over cables 92, it is transmitted by cables 94 through diodes 95 to selected terminals on terminal strips 96. As illustrated in FIG. 10, wires 94 are coupled to the terminals 3, 6 and 5 respectively on the terminal strips in junction box 93. Hence, the return signal is transmitted to cables 98 and to the displays 101 so that the digits 3, 6 and 5 appear on the display as a numerical code and in combination indicate the location of the signal received by the room unit.

Figures 11, 12, 13, 14:
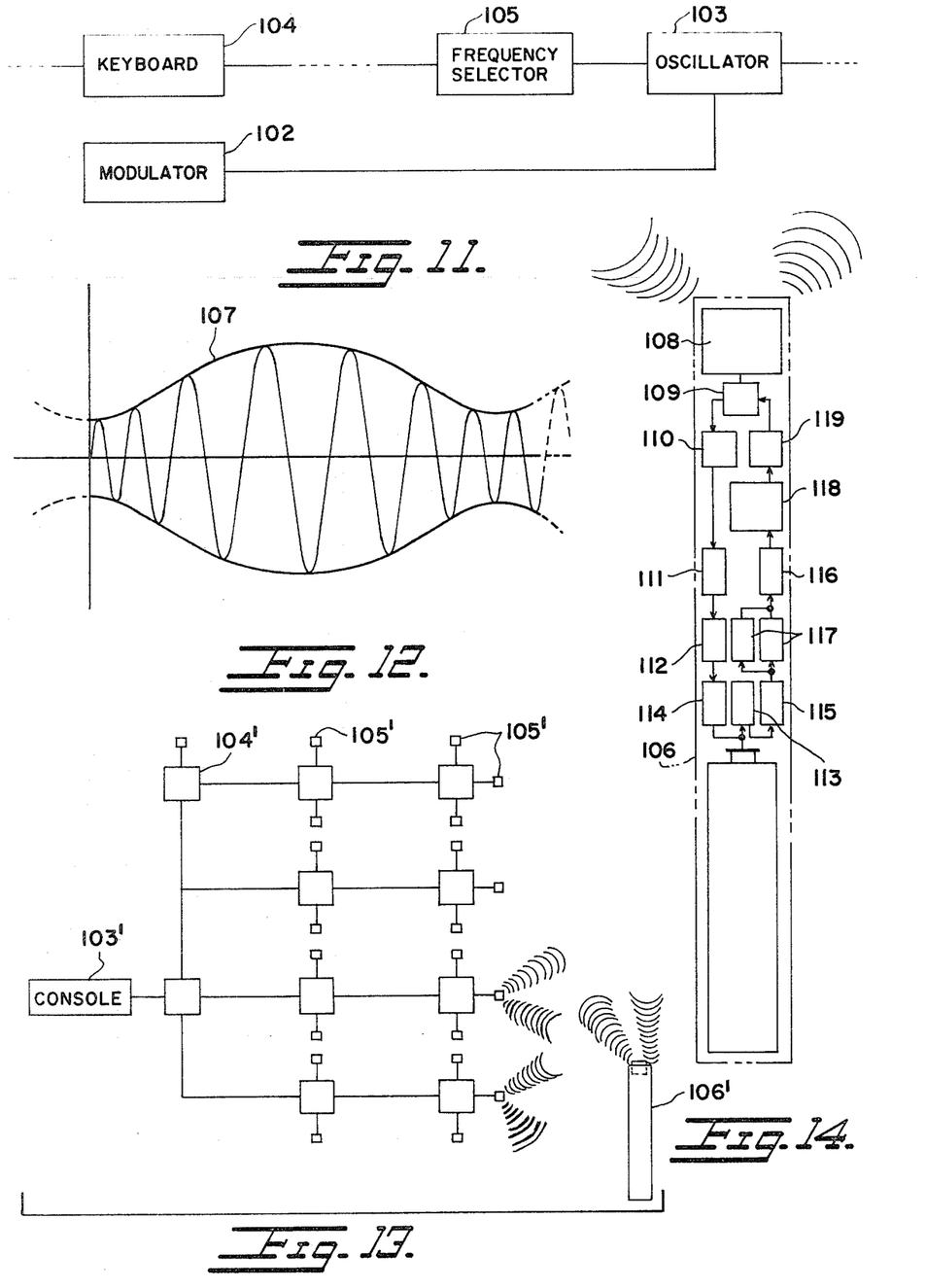
FIG. 11 is a partial block diagram of another embodiment of an electronic tracking and locating system constructed in accordance with the present invention.
FIG. 12 is a graphical illustration of a modulated ultrasonic signal generated and transmitted by the system illustrated in FIG. 11.
FIG. 13 is a block diagram of the layout of the electronic tracking and locating system illustrated in FIG. 11.
FIG. 14 is a schematic block diagram of one embodiment of a transceiver carried by the persons or objects to be located, for use in an electronic tracking and locating system constructed in accordance with the present invention.

FIGS. 11–14 illustrate still a further embodiment of the invention described herein. In FIG. 11, a partial schematic diagram of the signal generation and transmission means of this embodiment of the invention is shown. The console of the apparatus includes a modulator 102 which is coupled to oscillator 103 so that the signal transmitted by the transducer of the apparatus is amplitude modulated, as shown in FIG. 12. Keyboard 104 is coupled to frequency selector 105 and operates to select the frequencies for transmission as in the previous embodiments of the invention.

As shown in FIG. 13, console 103' is connected to a plurality of room units 104' which are connected to remote ultrasonic transducers 105'. Transceiver 106' is illustrated as a portable pen-shaped unit, and receives ultrasonic signals 107 of the form illustrated in FIG. 12. The console is connected by multi-conductor cables to each of the room units, and selected ultrasonic signals at frequencies designated to persons or objects in the system are transmitted into the area of surveillance by the room unit transducers. The ultrasonic signal transmitted is amplitude modulated at a sonic frequency over a selected range, such as, for example, 100–4,000 cycles. The modulating frequency is one of a plurality selected, and is generated within the console by modulator 102. The transceivers of the system receive signals only at one of the predetermined number of ultrasonic frequencies selected for transmission, and each include a demodulator and filter to detect the modulating frequency transmitted. The signal transmitted by the transceiver is of the same ultrasonic frequency as that received by the transceiver, and is also modulated at a fixed frequency. The modulation of the signal reduces noise in the return signal, and reduces any problems inherent therewith since the receivers in the room units must be broadbanded. The room unit receiver is electrostatic, and broadbanded so as to receive at any of the plurality of transceiver ultrasonic frequencies transmitted. The receiver also has a modulator and filter which is selective to the modulating frequency transmitted.

In FIG. 14, the pen unit transceiver is illustrated in detail. Transceiver 106 comprises a transducer 108, which may be a piezoelectric crystal, for receiving and transmitting ultrasonic signals. Transducer 108 is connected to a gate 109 which channels incoming signals to a preamplifier 110. A frequency detector 111 is coupled to the preamplifier, and detects the frequency of the signal transmitted thereto. A modulation frequency detector 112 is coupled to the frequency detector 111, and detects the modulating frequency of the signal. The modulating frequency detector is coupled to a first time delay unit 113, which controls the initiation of transmission of the return signal, by a capacitor 114. A second time delay unit 115 is coupled to the first time delay unit 113, and controls the duration of the return signal transmitted from the transceiver. Audio oscillator 116 is coupled to second time delay 115 by capacitors 117, and generates the return signal carrier frequency. Oscillator coil 118 is coupled to oscillator 116, and to an ultrasonic oscillator 119. Gate 109 is responsive to the activation of ultrasonic oscillator 119, and changes its mode in response thereto for transmitting an output signal from transceiver 106.

In operation, when one of the buttons on keyboard 104 is depressed, modulator 102 and frequency selector 105 are activated so as to cause oscillator 103 to generate an amplitude modulated signal at a predetermined frequency and radiate it into the area of surveillance. The signal is received by transceiver 106, and converted by transducer 108 to electrical signals, wherein it is examined by the modulating frequency detectors and carrier frequency detectors to determine if it corresponds to the frequencies designated to the transceiver carried by the person or object to be located. If so, the transceiver generates a return signal at a selected carrier frequency which is the same as that generated by the room unit, and at a modulating frequency, which may be different than those used by other transceivers, or the same. This signal is then detected by the receiver in the room unit, i.e. the carrier frequency and the modulating frequency are detected, and a signal is transmitted to the console in order to indicate the room in which the signal was received from the transceiver which responded. In either of the embodiments just described, the transceivers of the system receive signals at a specified carrier frequency transmitted and designated to them, and respond to the room units at the same frequency. The modulating frequencies used by the transceivers to modulate the carrier frequency are, however, either common to each other or different so as to increase the capacity of the system.

A signal received by transducer 106 is processed as follows:

The ultrasonic signals received by transducer 108 are transmitted to gate 109 and preamplifier 110. The signal is then amplified and transmitted to carrier frequency detector 111 to detect the signal frequency designated to transceiver 106. If such a frequency is detected, the signal is then passed through the modulation frequency detector 112 to detect the modulation frequency thereof, and again if the signal detected corresponds to the one designated to the transceiver, an output signal is generated and transmitted through capacitor 114 to first time delay unit 113. This time delay unit initiates transmission of the return signal, and delays the start of such transmission in order to prevent beginning of transmission of the signal by the transceiver before transmission by the room unit has ended. Time delay 113 initiates transmission, and is coupled to time delay 115 which controls the duration of the signal generated by the transceiver. Audio oscillator 116 generates the modulating signal, and the ultrasonic oscillator 119 generates the carrier frequency for transmission to the room units. When the ultrasonic oscillator is activated, gate 109 changes its mode from "receive" to "transmit," and feeds the signal to transducer 108 where it is converted into an ultrasonic signal and radiated throughout the room in which the transceiver is disposed.

While only several embodiments of the present invention have been shown and described, it will be obvious to those persons skilled in the art that many changes and modifications may be made thereunto without departing from the spirit and scope of the invention.

What is claimed is:

1. An electronic tracking and locating system for automatically locating at least one of a select group of individuals or objects disposed in different rooms within a selected area of surveillance, comprising:
    means for generating and transmitting an ultrasonic identification signal at one of a plurality of preselected frequencies to the different rooms throughout the selected area of surveillance, the frequency of said signal being unique with respect to the individual or object to be located;
    transceiving means, remote from said identification signal generation and transmission means, and carried by each individual or object within the select group, for receiving said information signal, and transmitting an output signal at a pre-selected ultrasonic frequency in response to an identification signal having a frequency corresponding to the frequency designated to the person or object and transceiving means;
    a plurality of means, selectively disposed in the separate rooms throughout the area of surveillance, for receiving said transmitted ultrasonic output signal from said transceiving means, and transmitting a location identification signal which identifies the location within the area of surveillance of said output signal receiving means; and
    means, disposed at a central location within the area of surveillance, for receiving said location identification signal and indicating the location of the person or object located.

2. The electronic tracking and locating system as recited in claim 1, wherein said identification signal generating and transmission means, comprises,
    a keyboard having a plurality of manually operated buttons, each representing a selected frequency designated to a particular person or object to be located,
    means, coupled to said keyboard, for selecting one of a plurality of preselected frequencies;
    an oscillator, coupled to said frequency selection means, and
    at least one signal transducers, coupled to said oscillator, for transmitting said identification signal within said selected area of surveillance.

3. The electronic tracking and locating system as recited in claim 2, wherein said transceiving means comprises,
    means for receiving signals at only a selected one of said preselected frequencies generated by said identification signal transmitting and generating means,
    an oscillator, coupled to said selected frequency signal receiving means, for generating a return signal at a preselected frequency upon the reception by said selected frequency signal receiving means of an identification signal having a frequency corresponding to that designated to the transceiving means and person or object to be located, a gate coupled to said oscillator and said receiving means, and a transducer, coupled to said gate for receiving said signal transmitted by said signal generating and transmitting means, and transmitting said return signal generated by said transceiving means oscillator.

4. The electronic tracking and locating system as recited in claim 3, wherein said transceiving means further comprises a time delay, coupled to said selected frequency signal receiving means, and to said transceiving means oscillator, for delaying the generation of said signal generated by said transceiving means oscillator for a predetermined period of time after reception of a signal having a frequency designated to the transceiver and the person or object to be located.

5. The electronic tracking and locating system as recited in claim 3, wherein said frequency selection means comprises a plurality of relay switches, coupled and responsive to said keyboard buttons, and a plurality of capacitors, coupled to said relay switches and said oscillator of said identification signal generating and transmission means, for selectively generating a signal of a predetermined frequency in response to the depression of at least one of said keyboard buttons.

6. The electronic tracking and locating system as recited in claim 1, wherein said transceiving means transmits said output signal at only one preselected frequency, all of said transceiving means disposed within the selected area of surveillance transmitting output signals at said preselected frequency.

7. The electronic tracking and locating system as recited in claim 1, wherein said identification signal generating and transmitting means further comprises means for initiating transmission of said identification signal at a predetermined time and for controlling the duration of the transmission of said identification signal, wherein said transceiving means comprises means for delaying the transmission of said output signal for a predetermined time period after the reception of an identification signal having a frequency corresponding to the frequency designated to said transceiving means, and for controlling the duration of the transmission of said output signal, and wherein said means for receiving said transmitted output signal from said transceiving means further comprises means for delaying the transmission of said location identification signal for a predetermined time period and thereby blocking transmission of said location identification signal during the period of time in which said location identification signal transmission is delayed.

8. The electronic tracking and locating system as recited in claim 1, wherein said means for generating and transmitting said identification signal further comprises a modulator for modulating said preselected frequency generated and transmitted by said means, wherein said transceiving means further comprises a demodulator for detecting the modulating frequency generated by said modulator of said identification signal generating and transmitting means, and a modulator for modulating said output signal transmitted by said transceiving means at a single modulating frequency, and wherein said means for receiving said transmitted output signal from said transceiving means further comprises a demodulator for detecting said single modulating frequency transmitted by said transceiving means modulator.

9. The electronic tracking and locating system as recited in claim 1, wherein said means for generating and transmitting said identification signal further comprises a modulator, for modulating said transmitted identification signal, wherein said transceiving means further comprises a demodulator for detecting said modulated signal transmitted by said signal generating and transmitting means, and a modulator for modulating said output signal transmitted by said transceiving means at one of a plurality of preselected modulating frequencies, said transceiving means each being designated one of said plurality of modulating frequencies, and wherein said means for receiving said transmitted output signal from said transceiving means further comprises a demodulator, for detecting said plurality of modulating frequencies transmitted by said transceiving means.

10. The electronic tracking and locating system as recited in claim 3, wherein said means for receiving said location identification signal includes a plurality of digital readout tubes, coupled to said means for receiving said transmitted output signal from said transceiving means.

* * * * *